_United States Patent Office_

2,915,550
Patented Dec. 1, 1959

2,915,550

METHOD FOR PREPARING ALKYLENE GLYCOL DICARBAMATES

John Barr Bell, Jr., Little Silver, N.J., and Vernon Arthur Currier, Austin, Tex., assignors to Jefferson Chemical Company, Inc., Houston, Tex., a corporation of Delaware No Drawing. Application July 29, 1957
Serial No. 674,589

13 Claims. (Cl. 260—482)

The present invention relates to a novel method for preparing alkylene glycol dicarbamates.

In accordance with this method, a β-hydroxyalkyl carbamate may be converted to an alkylene glycol dicarbamate by heating the former in the presence of an alcoholysis catalyst.

Ethylene glycol dicarbamate has previously been prepared by various methods. Known methods include the reaction of ethylene glycol with phosgene and ammonia, and the reaction of carbamic acid chloride with ethylene glycol. These methods are relatively unattractive because they do not offer a convenient and economical route for the preparation of the dicarbamate.

It has now been discovered that an alkylene glycol dicarbamate may be formed by reacting a β-hydroxyalkyl carbamate in the presence of an alcoholysis catalyst under a suitable reaction temperature. This reaction may be represented by the formula:

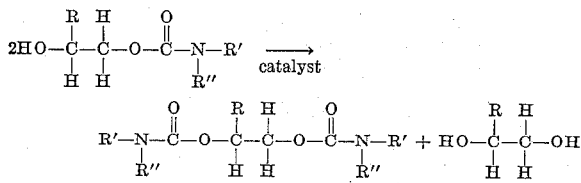

in which R is a member of the group consisting of hydrogen and an alkyl radical, and R' and R" represent a member of the group consisting of (1) hydrogen, (2) an alkyl radical having from 1 to 18 carbon atoms, (3) an aralkyl radical having from 7 to 12 carbon atoms, (4) an alkaryl radical, (5) a cycloalkyl radical, (6) an alkenyl radical and (7) a cycloalkenyl radical. Conversion of the carbamate to dicarbamate with the liberation of the corresponding alkylene glycol may be substantially quantitative; the unconverted β-hydroxyalkyl carbamate being available for recycle.

As indicated above, β-hydroxyalkyl carbamates, in general, may be employed in this reaction to form the corresponding dicarbamates. The most important feed materials are β-hydroxyethyl carbamate and β-hydroxy propyl carbamate in which the amino group is a primary amino group. However, the amino group may also be a substituted amino group, as indicated above, in which R' and R" may have the values noted above.

Examples of N-substituted β-hydroxyalkyl carbamates which may be employed include N-methyl-β-hydroxyethyl carbamate, N,N-dimethyl-β-hydroxyethyl carbamate, N-butyl-β-hydroxyethyl carbamate, N-octadecyl-β-hydroxyethyl carbamate, N-dodecyl-β-hydroxyethyl carbamate, N-butyl-β-hydroxypropyl carbamate, N-allyl-β-hydroxyethyl carbamate, N-cyclohexyl-β-hydroxyethyl carbamate, N-benzyl-β-hydroxyethyl carbamate, N-phenyl-β-hydroxyethyl carbamate, and N-tolyl-β-hydroxyethyl carbamate. Although the N-substituted radicals represented by R' and R" will generally be saturated aliphatic hydrocarbon radicals, unsaturated and cyclic hydrocarbon radicals, illustrated above, may also be employed.

The well known alcoholysis catalysts may be employed for this reaction. Thus, the catalyst may be the salt or base of a metal including such materials as sodium hydroxide and potassium hydroxide; sodium and potassium carbonate; soluble salts of copper, cobalt, iron, nickel, tin, lead, zinc, barium, strontium, aluminum and magnesium, such as ferric chloride, manganous chloride, cuprous chloride, stannic chloride and cupric chloride, the alcoholates of sodium, potassium, aluminum and magnesium, and the metal borates. The preferred catalysts are cuprous chloride, potassium carbonate, potassium hydroxide and stannic chloride. The preferred catalysts have been observed in some cases to be substantially more effective than other catalysts in the group.

The amount of catalyst employed in this reaction affects the reaction rate but is not critical. Generally, a very small amount of the catalyst will be adequate to promote the desired conversion to dicarbamate. Thus, an amount of iron salt equivalent to the presence of iron in the order of 20 parts per million by weight based on the weight of a β-hydroxyethyl carbamate charge has proven very effective. Normally, the amount of catalyst will be between about 0.001% and about 1% by weight based on the carbamate charged although larger amounts may also be employed.

This process should be conducted at a temperature above 50° C. and under conditions effecting reflux of the particular β-hydroxyalkyl carbamate employed. The desired reflux condition is preferably obtained by conducting the reaction at an elevated temperature. Such a temperature may be from about 130° to 160° C., although the range from about 140–150° C. is preferred. Extended exposure to temperatures in excess of 160° C. tends to induce harmful decomposition of the carbamate feed to gaseous carbon dioxide and amines. The desired dicarbamate product is also decomposed by such high temperatures with resultant gas evolution and the production of unidentified liquid and solid products. While atmospheric pressures may be employed, substantially reduced pressures are preferably employed to effect refluxing of the carbamate. Generally, this will be a pressure below 50 and preferably below about 10 (mm.) millimeters of mercury absolute.

Refluxing of the β-hydroxyalkyl carbamate to effect dicarbamate formation may be accomplished in the presence of a refluxing solvent, preferably a hydrocarbon solvent. Suitable solvents include xylene and toluene.

In practice, the β-hydroxyalkyl carbamate is introduced into a vessel having provision for maintaining suitable reflux conditions, i.e. a temperature in the range of 130°–160° C. for a period of time (usually 30 minutes) at atmospheric pressure. The pressure is then reduced below about 50 mm. of mercury absolute. The catalyst is added at the commencement of the reaction in an amount in the range of 0.001 to 1 weight percent based on the carbamate feed. During the reaction, by-product glycol is distilled off overhead. The progress of the reaction may be noted by observing the amount of glycol distilled off.

The following examples illustrate the practice of this invention:

*Example I*

210 g. (2 mols) of β-hydroxyethyl carbamate was heated for 30 minutes at 150° C. at atmospheric pressure in the presence of 1.05 g. cuprous chloride catalyst. In 1.5 hours, 66 g. of ethylene glycol containing 17 g. of β-hydroxyethyl carbamate was distilled from the reaction mixture at a maximum pot temperature of 147° C. and a head temperature range of 63–124° C. at 1–1.7 mm. pressure. The crude reaction product (136 g.) was dissolved in 172 g. of boiling water, filtered hot, the filtrate cooled to 25° C., and the crystallized ethylene glycol dicarbamate collected on a funnel. The product weighed 112.5 g. and had a melting range of 168–171° C. The ethylene glycol dicarbamate yield was 76% based on the charge and 83% based on β-hydroxyethyl carbamate actually consumed. No credit was taken for the β-hydroxyethyl dicarbamate that could be recovered from the mother liquor for recycle. There was a column hold-up of six grams and a material loss due to decomposition of only three grams.

*Example II*

210 g. (2 mols) of β-hydroxyethyl carbamate was heated for 30 minutes at 150° C. at atmospheric pressure in the presence of 1.05 g. cuprous chloride (0.5% of carbamate charged by weight) catalyst. The pressure was then reduced to 2 mm. mercury. In one hour, 61 g. ethylene glycol containing 12 g. of unreacted β-hydroxyethyl carbamate was distilled from the reaction mixture through a 12-inch by 1-inch column at a pot temperature range of 125–146° C. and a head temperature range of 65–125° C. The ethylene glycol dicarbamate was washed with three 100 g. portions of distilled water and the dried product weighed 102 g. representing a yield of 69% based on β-hydroxyethyl carbamate charged. Unreacted β-hydroxyethyl carbamate (45 g.) was recovered from the water with the result that the ethylene glycol dicarbamate yield amounted to 94.6% on allowing for the unreacted β-hydroxyethyl carbamate.

One recrystallization of the ethylene glycol dicarbamate from water (2.5–4 parts per part of ethylene glycol dicarbamate) to remove the color imparted to the product by the catalyst results in a recovery of 85–90% of a white product having a melting range of 170–172° C.

*Example III*

100 parts of β-hydroxyethyl carbamate were heated with 0.5 parts by weight of potassium carbonate at 95–144° C. and 1–2 millimeters (mm.) of pressure absolute under a simple distillation head for a period of five hours. A substantial proportion of ethylene glycol and some unconverted β-hydroxyethyl carbamate were collected overhead. On cooling, the distillation residue turned to a white solid. This product was purified by recrystallization from water. A yield of 63% by weight of ethylene glycol dicarbamate having a melting point of 167–169° C. was obtained based on the β-hydroxyethyl carbamate charged.

*Example IV*

100 parts of β-hydroxypropyl carbamate were heated for four hours in the presence of 0.5 parts by weight of ferric chloride at a temperature of 140° C. and a pressure of about 1 mm. Propylene glycol was recovered overhead during the vacuum distillation. On cooling, a substantial yield of propylene glycol dicarbamate was recovered in white crystalline form from the distillation residue. The purified propylene glycol dicarbamate had a melting point of 130–131° C.

*Example V*

210 g. of β-hydroxyethyl carbamate was heated for 30 minutes in the presence of 4.2 g. (2%) of cuprous chloride at 150° C. The pressure was reduced to 2 mm. and 72 g. of ethylene glycol containing 15 g. of β-hydroxyethyl carbamate was recovered overhead in 1.5 hours. The recovered ethylene glycol dicarbamate weighed 108 g. and represented a yield of 73% based on charge. Since an additional 23 g. of β-hydroxyethyl carbamate was recovered from water washes of the product, the yield amounted to 89% on allowing for the unreacted β-hydroxyethyl carbamate. Losses due to decomposition were 3.3% of the charge.

*Example VI*

212.5 g. of β-hydroxyethyl carbamate was heated at 115–133° C. for seven hours in the presence of 1.06 g. of potassium hydroxide. During this reaction time, ethylene glycol (41.5 g.) was distilled off (at partial reflux) at a head temperature of 64–69° C. at 1 mm. pressure. The crude reaction product weighed 165 g. On recrystallization, the ethylene glycol dicarbamate weighed 66 g. representing a yield of 44.5% based on the charge. Losses due to decomposition were 3% of the charge.

*Example VII*

26.5 g. (0.25 mols) of β-hydroxyethyl carbamate was heated separately at 130° C. for 3–4 hours with 0.5 weight percent sodium hydroxide, lead oxide, zinc oxide, sodium bicarbonate, trisodium phosphate, manganous chloride, cobaltous chloride, magnesium chloride, stannic chloride, cupric chloride, calcium hydroxide at atmospheric pressure. On cooling, the reaction mixtures solidified and analyzed as containing ethylene glycol dicarbamate in yields of 14–31% based on the β-hydroxyethyl carbamate charged.

*Example VIII*

26.5 g. (0.25 mols) of β-hydroxyethyl carbamate was heated separately at 150° C. for 0.5–1.5 hours with 0.1–0.5 weight percent potassium carbonate, sodium hydroxide, sodium methylate, cupric sulfate, cobalt nitrate, cuprous chloride and stannic chloride. On cooling, the reaction mixtures solidified and analyzed as containing ethylene glycol dicarbamate in yields of 15.5–34% based on the β-hydroxyethyl carbamate charged.

*Example IX*

119 g. (1 mol) of N-methyl-β-hydroxyethyl carbamate and 0.6 g. of cuprous chloride were charged to a flask and heated for 30 minutes at 150° C. The pressure was then reduced to 3.5 mm. and 16.5 grams of ethylene glycol was distilled off (70° C.) through a short column in 45 minutes at a pot temperature of 150° C. The column was removed (8.5 g. hold-up) and the remaining N-methyl-β-hydroxyethyl carbamate continuing ethylene glycol was stripped from the reaction flask making no attempt to obtain a product in high yield. The solid residue (44 g.) was dissolved in water (180 g.) and filtered. The N,N'-dimethyl ethylene glycol dicarbamate crystallized as white needles. The dried product (30 g.) represented a yield of 34% based on N-methyl-β-hydroxyethyl carbamate charged and melted at 127–129° C.

Obviously many modifications and variations of the invention, as hereinbefore set forth, may be made without departing from the spirit and scope thereof, and therefore only such limitations should be imposed as are indicated in the appended claims.

We claim:

1. A method for preparing an alkylene glycol dicarbamate which comprises heating a β-hydroxyalkyl carbamate represented by the formula:

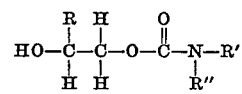

in which R is selected from the group consisting of hydrogen and an alkyl radical containing only hydrogen and carbon, and R' and R" are selected from the group consisting of hydrogen, an alkyl radical, an aralkyl radical, an alkaryl radical, a cycloalkyl radical, an alkenyl radical and a cycloalkenyl radical, each of the foregoing radicals containing only hydrogen and carbon, at a temperature of 50°–160° C. in the presence of about 0.001 to 1% by weight based on said carbamate of an alcoholysis catalyst.

2. A method for preparing an alkylene glycol dicarbamate which comprises refluxing a β-hydroxyalkyl carbamate represented by the formula:

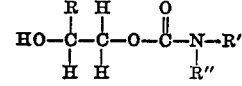

in which R is selected from the group consisting of hydrogen and an alkyl radical containing only hydrogen and carbon, and R' and R" are selected from the group consisting of hydrogen, an alkyl radical, an aralkyl radical, an alkaryl radical, a cycloalkyl radical, an alkenyl radical and a cycloalkenyl radical, each of the foregoing radicals containing only hydrogen and carbon, at a temperature of 50°–160° C. at a temperature in the range of 50°–160° C., at a pressure below about 50 mm. of mercury absolute, and in the presence of about 0.001 to 1% by weight based on said carbamate of an alcoholysis catalyst.

3. A method according to claim 2 in which said catalyst is stannic chloride.

4. A method according to claim 2 in which said catalyst is potassium carbonate.

5. A method according to claim 2 in which said catalyst is cuprous chloride.

6. A method for preparing ethylene glycol dicarbamate which comprises heating β-hydroxyethyl carbamate at a temperature in the range of 50°–160° C. in the presence of about 0.001 to 1% by weight based on said carbamate of an alcoholysis catalyst.

7. A method for preparing ethylene glycol dicarbamate which comprises refluxing β-hydroxyethyl carbamate at a temperature in the range of 50°–160° C. and under reduced pressure in the presence of about 0.001 to 1% by weight based on said carbamate of cuprous chloride.

8. A method for preparing ethylene glycol dicarbamate which comprises heating β-hydroxyethyl carbamate at a temperature in the range of 50°–160° C., a pressure below about 50 mm. of mercury absolute and in the presence of about 0.001 to 1% by weight based on said carbamate of an alcoholysis catalyst.

9. A method according to claim 8 in which said catalyst is cuprous chloride.

10. A method according to claim 8 in which said catalyst is potassium carbonate.

11. A method according ot claim 8 in which said catalyst is stannic chloride.

12. A method for preparing N,N'-dimethyl-ethylene glycol dicarbamate which comprises heating N-methyl-β-hydroxyethyl carbamate in the presence of about 0.001 to 1% by weight based on said carbamate of a catalyst, selected from the group consisting of cuprous chloride, stannic chloride and potassium carbonate, at reduced pressure and a temperature in the range of 50–160° C.

13. A method for preparing propylene glycol dicarbamate which comprises heating β-hydroxypropyl carbamate in the presence of about 0.001 to 1% by weight based on said carbamate of a catalyst, selected from the group consisting of cuprous chloride, stannic chloride and potassium carbonate, at reduced pressure and a temperature in the range of 50–160° C.

References Cited in the file of this patent

UNITED STATES PATENTS

| | | |
|---|---|---|
| 2,627,524 | Malkemus | Feb. 3, 1953 |
| 2,755,286 | Bell et al. | July 17, 1956 |
| 2,813,104 | McDowell | Nov. 12, 1957 |

OTHER REFERENCES

Paquin: Chem. Abst., vol. 42, col. 124 (1948).